United States Patent [19]

Yamada et al.

[11] Patent Number: 5,616,000

[45] Date of Patent: Apr. 1, 1997

[54] STATOR OF TORQUE CONVERTER FOR VEHICLES IMPROVED TO SUPPRESS SEPARATION OF WORKING FLUID

[75] Inventors: Masatoshi Yamada, Nagoya; Yasuhiro Kondo, Aichi-ken; Kenji Imai, Komaki; Masahiro Kojima, Okazaki; Nobuyuki Nagashima, Toyota, all of Japan

[73] Assignees: Kabushiki Kaisha Toyota Chuo Kenkyusho, Aichi-ken; Toyota Jidosha Kabushiki Kaisha, Toyota, both of Japan

[21] Appl. No.: 603,991

[22] Filed: Feb. 20, 1996

[30] Foreign Application Priority Data

Feb. 21, 1995 [JP] Japan ........................ 7-56589

[51] Int. Cl.$^6$ .................................................. F04D 29/44
[52] U.S. Cl. .................. 415/191; 415/181; 415/208.2; 415/208.3; 415/208.5; 415/211.2
[58] Field of Search ............... 415/191, 208.2, 415/208.3, 208.5, 211.1, 211.2, 181, 186, 188, 914

[56] References Cited

U.S. PATENT DOCUMENTS 1,673,554  6/1928  Freudenreich et al. ............. 415/191
2,696,171  12/1954  Jandasek et al. ............. 415/208.5
3,192,719  7/1965  Kronogard.
4,180,978  1/1980  Maddock.

FOREIGN PATENT DOCUMENTS 880252  3/1943  France.
891435  3/1944  France.
61-42138  9/1986  Japan.
5-223146  8/1993  Japan.
0252702  8/1927  United Kingdom .............. 415/181

*Primary Examiner*—Edward K. Look
*Assistant Examiner*—Christopher Verdier
*Attorney, Agent, or Firm*—Oblon, Spivak, McClelland, Maier & Neustadt, P.C.

[57] ABSTRACT

To suppress a separation of working fluid from the vane surface during operation at and around a fluid coupling condition attained after a substantial completion of torque conversion, the aerofoil and the array of stator vanes of a torque converter for vehicles are arranged such that a pressure side leading edge area and a suction side trailing edge area of the vane respectively satisfy the following conditions based upon the parameters assumed in FIG. 2:

$$(D_L - D_{LMIN})/D_{LSL} \leq 0.38(X_L/S_L - 0.08)^{1.7}$$

$$(D_T - D_{TMIN})/D_{TST} \leq 0.36(X_T/S_T - 0.45)^{1.7}$$

6 Claims, 7 Drawing Sheets

C1

C2

D

E

STATOR OF TORQUE CONVERTER FOR VEHICLES IMPROVED TO SUPPRESS SEPARATION OF WORKING FLUID

BACKGROUND OF THE INVENTION

1. Field of the Invention

The present invention relates to a torque converter for vehicles, and more particularly, to an improvement thereof for improving the fuel consumption of a vehicle by decreasing power loss at the torque converter in its operation at and around the fluid coupling condition attained after a substantial completion of torque conversion, the improvement being accomplished by optimizing the aerofoil and the array configuration of stator vanes such that a separation of working fluid on the surface of the stator vanes is suppressed.

2. Description of the Related Art

In the torque converter having a fluid circulation system in which a working fluid circulates through a pump, a turbine and a stator (hydrodynamic type torque converter), the flow of working fluid discharged from the turbine is returned to the pump through a deflection applied by the stator, whereby the ratio of the torque of the turbine, i.e. torque output means, to that of the pump, i.e. torque input means, is continuously changed from a predetermined maximum value to a value close to 1, as the ratio of the rotation speed of the turbine to that of the pump rises up from zero, as well known in the art. Further, in the case of the torque converter assembled in the drive system of a vehicle, the torque converter operates such that, after it has completed the torque conversion operation of first magnifying the wheel driving torque at a certain maximum ratio and then gradually and steplessly decreasing the vehicle driving torque so as to provide a smooth start-up and acceleration of the vehicle, thereafter it operates, for the most part of the operation period thereof, as a fluid coupler in which the turbine rotates at a rotation speed slightly lower than that of the pump due to a slippage unavoidable to transmit the coupling torque therebetween.

Since the torque converter of the vehicle is thus generally operated in the fluid coupling condition, it is expected that, if the power loss of the torque converter during its fluid coupling operation is decreased, the fuel consumption of the vehicle is correspondingly improved.

A general example of the aerofoil and the array configuration of the stator vanes of the torque converter for vehicles is shown in FIG. 1, together with a general pattern of the flow of working fluid, flowing across the array of stator vanes, in the fluid coupling condition of the torque converter. In FIG. 1, the stator 10 includes stator vanes 12, 14, 16 and so on, positioned between a diagrammatically shown array of turbine blades 18 and a diagrammatically shown array of pump blades 20, to introduce the flow of working fluid discharged from the array of turbine blades to the array of pump blades by applying a deflection thereto. Although there is a certain disturbance in the flow of working fluid moving from the outlet of the array of turbine blades to the stator 10 and also in the flow of working fluid moving from the stator to the inlet of the array of pump blades 20, since the inlet and the outlet stream line of the working fluid to and from each of the array of stator vanes are generally maintained stable such as shown by inlet stream lines 22, 24 and 26 and outlet stream lines 28, 30 and 32 with respect to the vanes 12, 14 and 16, the flow of working fluid moving through a space between each two adjacent vanes such as 12 and 14 may be handled as a flow of working fluid 32 corresponding to a space portion hatched in the figure.

Referring to the flow of working fluid 32, a separation of the working fluid would occur at: a portion 34 of the pressure side surface of the vane 12 located adjacent to the leading edge thereof where the suppression of separation of the working fluid by the adjacent vane 14 is hardly effected; and a portion 36 of the suction side surface of the vane 14 located adjacent the trailing edge thereof where the suppression of separation of the working fluid by the adjacent vane 12 is hardly effected.

With respect to the surface portion 34, it is considered that whether a separation of the working fluid occurs or not at this surface portion is affected by the effect of the pressure side surface of the vane 12 adjacent the leading edge thereof against the change of the width of the passage presented for the flow of working fluid 32 and the angle made by the surface portion 34 with respect to the flow of working fluid 32, whereas, with respect to the surface portion 36, it is considered that whether a separation of working fluid occurs or not at this surface portion is affected by the effect of the suction side surface of the vane 14 adjacent the trailing edge thereof against the change of the width of the passage presented for the flow of working fluid 32 and the angle made by the surface portion 36 with respect to the flow of working fluid 32.

SUMMARY OF THE INVENTION

Based upon the above-mentioned considerations, the present invention contemplates to obtain certain conditions for suppressing the separation of the working fluid from the pressure side surface portion of the stator vane located adjacent to the leading edge thereof and the suction side surface portion of the stator vane located adjacent to the trailing edge thereof, so as to provide an improved stator of a torque converter for vehicles.

In order to solve the above-mentioned problems, the inventors of the present application assumed several parameters with respect to a general configuration of array and aerofoil of stator vanes of a torque converter for vehicles such as shown in FIG. 2, and investigated through experiments and analyses if there is available any general condition for optimizing the aerofoil and the array configuration of the stator vanes to suppress each of those separations of working fluid.

As a result, it was confirmed that the separation of working fluid which would occur at an area of the pressure side surface of the stator vane located adjacent to the leading edge ($L_1$) thereof in a fluid coupling condition attained after a substantial completion of torque conversion and therearound is effectively suppressed when the aerofoil and the array configuration of the stator vanes are such that, as viewed in a change of diameter ($D_L$) of a circle tangentially contacting with both said pressure side leading edge area surface of said first stator vane ($V_1$) and an inlet stream line ($F_a$) of working fluid directed to a leading edge ($L_2$) of a second one ($V_2$) of said array of stator vanes downstream of said first stator vane ($V_1$) along a flow of the working fluid, said circle substantially satisfies the following condition, for the purpose of suppressing a separation of the working fluid from said pressure side leading edge area surface of said first stator vane ($V_1$) in a fluid coupling condition attained after a substantial completion of torque conversion and therearound, against a shifting thereof between a position of $X_L=0.08S_L$ from a cross point (M) of a perpendicular extended from the leading edge ($L_1$) of said first stator vane ($V_1$) to said inlet stream line ($F_a$) and a position where it traverses the leading edge ($L_2$) of said second stator vane ($V_2$):

$$(D_L-D_{LMIN})/D_{LSL} \leqq 0.38(X_L/S_L-0.08)^{1.7}$$

wherein $S_L$: distance from point M to leading edge $L_2$ along inlet stream line $F_a$ $X_L$: variable expressing distance from point M along inlet stream line $F_a$ $D_L$: diameter of the circle according to the above definition which tangentially contacts inlet stream line $F_a$ at $X_L$ $D_{LMIN}$: minimum value of $D_L$ $D_{LSL}$: diameter of the circle according to the above definition which tangentially contacts inlet stream line $F_a$ at a position of $X_L=S_L$, i.e. leading edge $L_2$ Further, it was also confirmed that the separation of working fluid which would occur at an area of the suction side surface of the stator vane located adjacent to the trailing edge thereof in a fluid coupling condition attained after a substantial completion of torque conversion and therearound is effectively suppressed when the aerofoil and the array configuration of stator vanes are such that, as viewed in a change of diameter ($D_T$) of a circle tangentially contacting with both said suction side trailing edge area surface of said first stator vane ($V_2$) and an outlet stream line ($F_b$) of working fluid extending from a trailing edge ($T_1$) of a second one ($V_1$) of said array of stator vanes upstream of said first stator vane ($V_2$) along a flow of the working fluid, said circle substantially satisfies the following condition, for the purpose of suppressing a separation of the working fluid from said suction side trailing edge area surface of said first stator vane ($V_2$) in a fluid coupling condition attained after a substantial completion of torque conversion and therearound, against a shifting thereof between a position of $X_T=0.45S_T$ from the trailing edge ($T_1$) of said second stator vane ($V_1$) and a position where it traverses a cross point (N) of a perpendicular extended from a trailing edge ($T_2$) of said first stator vane ($V_2$) to said outlet stream line ($F_b$):

$$(D_T-D_{TMIN})/D_{TST} \leqq 0.36(X_T/S_T-0.45)^{1.7}$$

wherein $S_T$: distance from trailing edge $T_1$ to point N along outlet stream line $F_b$ $X_T$: variable expressing distance from point $T_1$ along outlet stream line $F_b$ $D_T$: diameter of the circle according to the above definition which tangentially contacts outlet stream line $F_b$ at $X_T$ $D_{TMIN}$: minimum value of $D_T$ $D_{TST}$: diameter of the circle according to the above definition which tangentially contacts outlet stream line $F_b$ at a position of $X_T=S_T$, i.e. point N Therefore, the present invention proposes a stator of a torque converter for vehicles in the construction that satisfies at least one of the above-mentioned conditions with respect to the leading edge area of the pressure side surface and the trailing edge area of the suction side surface of the stator vanes.

As will be appreciated from the analyses and the results of experiments with respect to several stators having various aerofoil and array configurations of stator vanes described hereinbelow with reference to the accompanying drawings, when the above-mentioned respective conditions with regard to the leading edge area of the pressure side surface and the trailing edge area of the suction side surface of the stator vanes are satisfied, the occurrence of the separation at the leading edge area of the pressure side surface and the trailing edge area of the suction side surface of the stator vanes in a fluid coupling condition attained after a substantial completion of torque conversion are effectively suppressed, whereby the power loss at the stator in the fluid coupling operation of the torque converter is effectively decreased, with a corresponding increase of the volume factor of the stator, thereby accomplishing a corresponding improvement of the fuel consumption of the vehicle.

BRIEF DESCRIPTION OF THE DRAWING

In the accompanying drawings.

DESCRIPTION OF THE EMBODIMENTS

In the following, referring to the accompanying drawings, the relationship between the stator vane configuration characteristics based upon the parameters defined in FIG. 2 and the working fluid separation suppression performance will be described with respect to several embodiments of a torque converter for vehicles which are different in the combination of aerofoil and array configuration of stator vanes, to introduce in a general condition for suppressing each of the separation of working fluid at the leading edge area of the pressure side surface and the trailing edge area of the suction side surface of the stator vanes.

Figure 2:
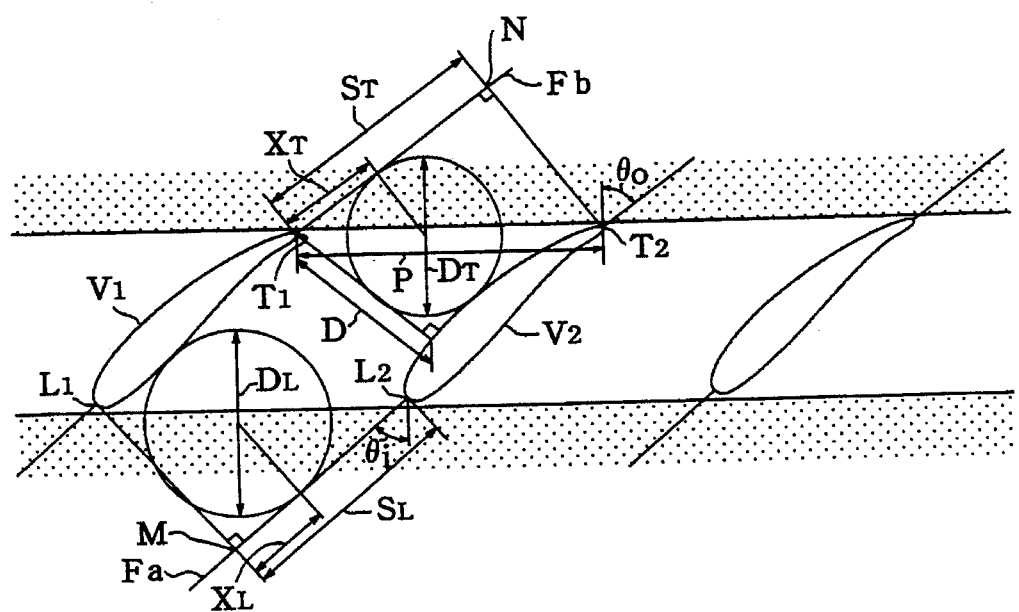
FIG. 2 is a diagrammatic view showing assumption of parameters for the analyses of arrays of stator vanes according to the present invention.

The parameters for expressing the aerofoil and array characteristics of stator vanes in the fluid coupling condition of the torque converter according to the present invention are as shown in FIG. 2. In more detail, taking optionally two stator vanes arrayed adjacent to one another, developing a cross section thereof into a plane along a cylinder centered at the central axis of the torque converter and traversing a central point between the root and the tip of one of the stator vanes, one of the vanes located upstream of the other as viewed along the flow of working fluid flowing across the vanes is named as $V_1$ while the other located downstream is named as $V_2$, then a perpendicular is extended from the leading edge $L_1$ of the vane $V_1$ to an inlet stream line $F_a$ reaching the leading edge $L_2$ of the vane $V_2$ to define a cross point M thereof, and then the distance between the point M and the leading edge $L_2$ is denoted as $S_L$, while a distance from the point M to any optional point on the inlet stream line $F_a$ within the distance $S_L$ is denoted as $X_L$. Then, taking the inlet stream line $F_a$ as an abscissa of variable $X_L$, the diameter of a circle which has its center at a position of $X_L$ along the abscissa while tangentially contacting both the abscissa and the pressure side surface of the vane $V_1$ is denoted as $D_L$. In the shown embodiment, the inflow angle $\theta_i$ of the working fluid flowing into the stator vanes is about 60° which is a typical value in this kind of torque converters.

Similarly, a perpendicular from the trailing edge $T_2$ of the vane $V_2$ is extended to an outlet stream line $F_b$ starting from the trailing edge $T_1$ of the vane $V_1$ to define a cross point N thereof, and then the distance between the trailing edge $T_1$ and the point N is denoted as $S_T$, while a distance from the trailing edge $T_1$ to any optional point on the outlet stream line $F_b$ within the distance $S_T$ is denoted as $X_T$. Then, taking the outlet stream line $F_b$ as an abscissa of variable $X_T$, the diameter of a circle which has a center at a position of $X_T$ along the abscissa while tangentially contacting both the abscissa and the suction side surface of the vane $V_2$ is denoted as $D_T$. The outflow angle $\theta_o$ of the working fluid flowing out of the stator vanes is obtained experimentally, or it may be estimated according to the following formula known as Einley's Formula:

$$\theta_o = |-(8/7)\cos^{-1}(D/P) + 10.7|$$

wherein D is the shortest distance between the trailing edge $T_1$ and the vane $V_2$, and P is the pitch between the vanes $V_1$ and $V_2$. $\theta_o$ is in the unit of degrees (°).

Figure 3:
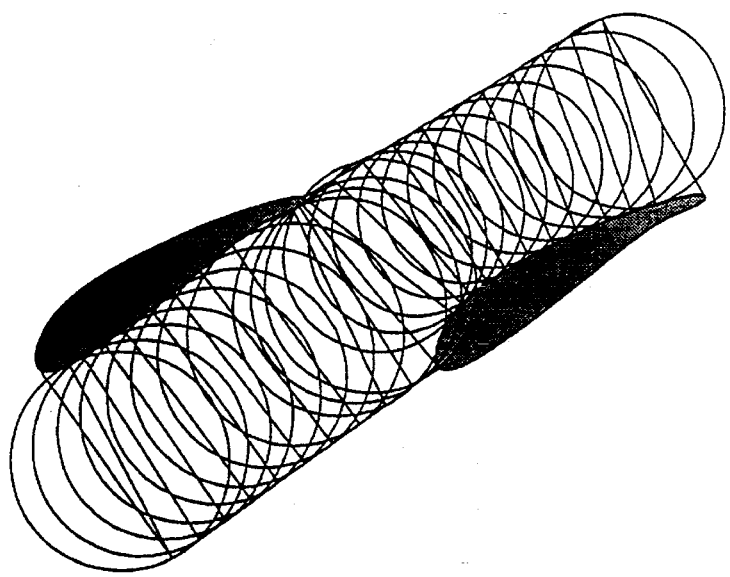
FIG. 3 is a diagrammatic view showing a change of diameters $D_L$ and $D_T$ according to $X_L$ and $X_T$, based upon the assumption in FIG. 2, with respect to an array of vanes.
Figure 4:
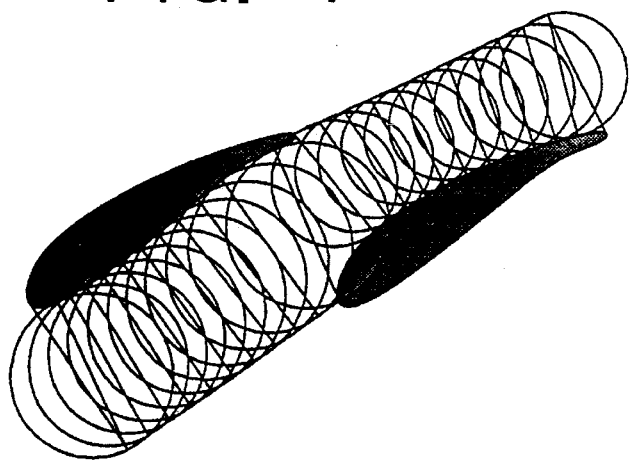
FIG. 4 is a diagrammatic view showing a similar change of the diameters to that in FIG. 3, with respect to an array of vanes of the same aerofoil configuration but further less spaced than in FIG. 3.
Figure 5:
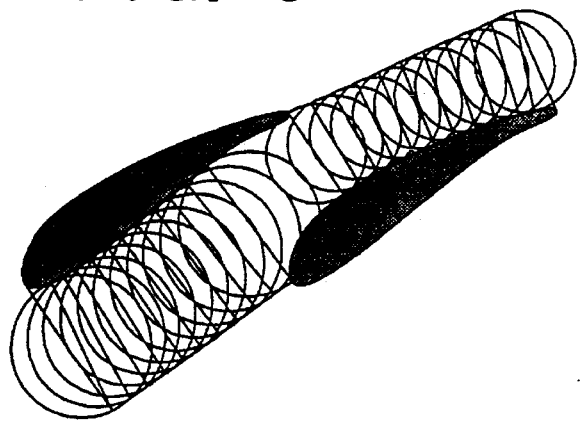
FIG. 5 is a diagrammatic view showing a similar manner of change of the diameters as in FIGS. 3 and 4, with respect to an array of vanes of the same aerofoil configuration as in FIGS. 3 and 4 but less spaced than in FIG. 4.

When the parameters are set as above, even with the same aerofoil configuration of the vanes $V_1$ and $V_2$, $S_L$ and $S_T$ change according to changes of the vane spacing. Accordingly, the change of $D_L$ against $X_L/S_L$ and that of $D_T$ against $X_T/S_T$ vary. Examples of such performance changes are shown in FIGS. 3, 4 and 5. In these three figures, the aerofoil configuration of the vanes is the same, but the vane spacing is different such that the vane spacing of the array of vanes shown in FIG. 3 is larger than that of FIGS. 4 and 5 and that the vane spacing of the array of vanes of FIG. 4 is smaller than that of FIG. 3 but larger than that of FIG. 5. From these figures it will be appreciated that the relationship between $D_L$ and $X_L/S_L$ and that between $D_T$ and $X_T/S_T$ are different from one another in these three arrays of vanes.

Figure 1:
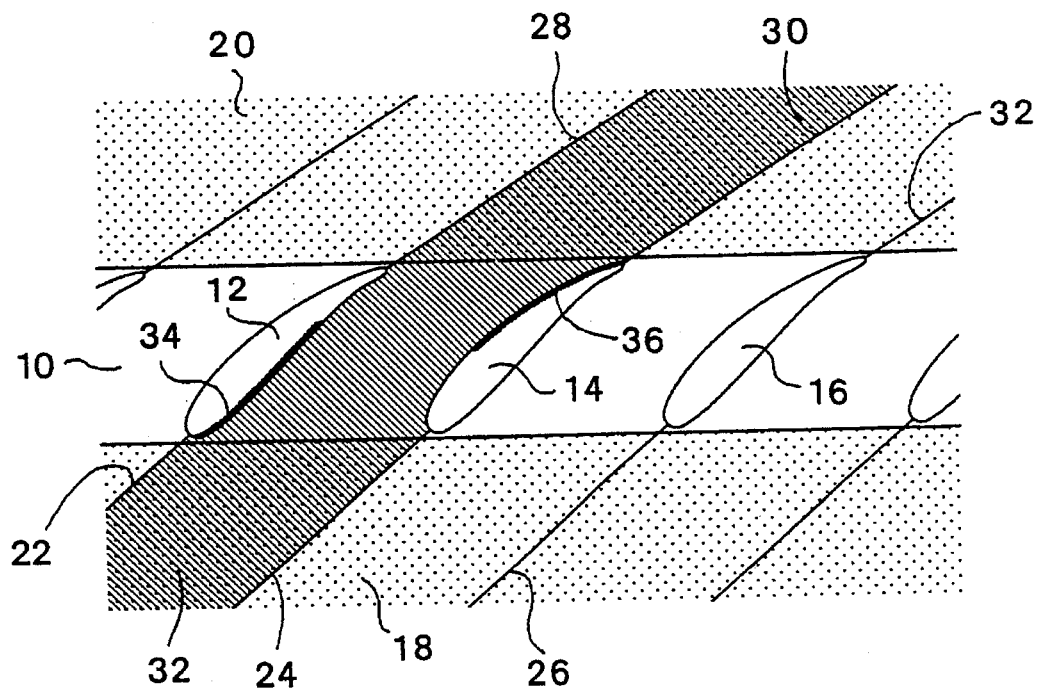
FIG. 1 is a diagrammatic view showing generally the flow of working fluid flowing across the array of stator vanes of a torque converter for vehicles during operating at and around the fluid coupling condition.
Figure 6:
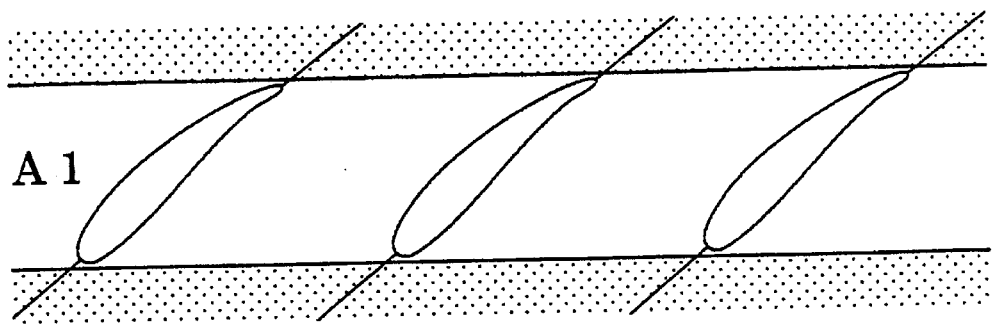
FIGS. 6–15 are diagrammatic views each showing a vane array of which the experimental researches according to the present invention were carried out.
Figure 7:
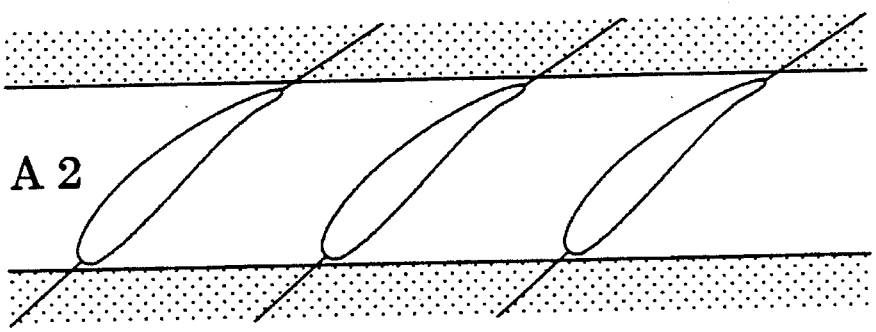
Figure 8:
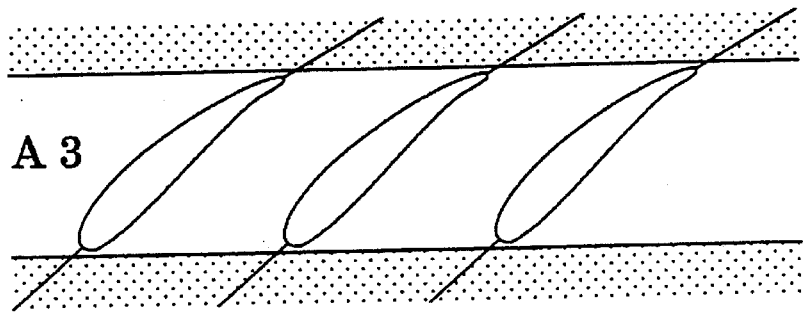
Figure 9:
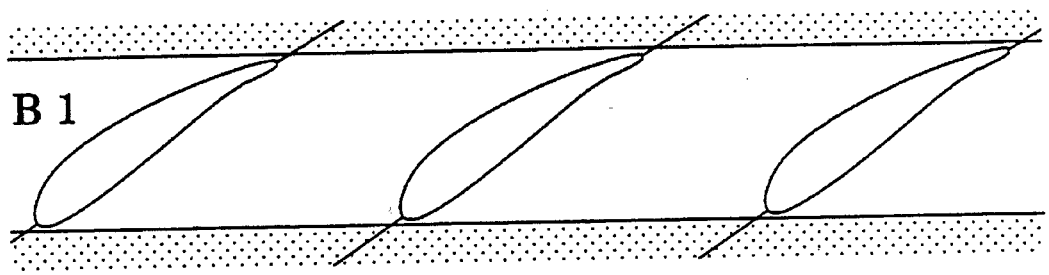
Figure 10:
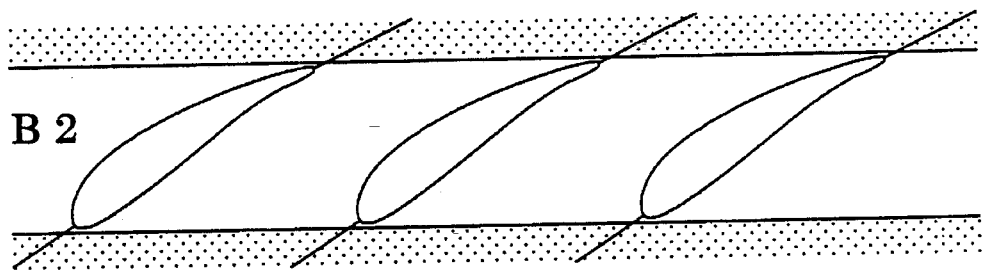
Figure 11:
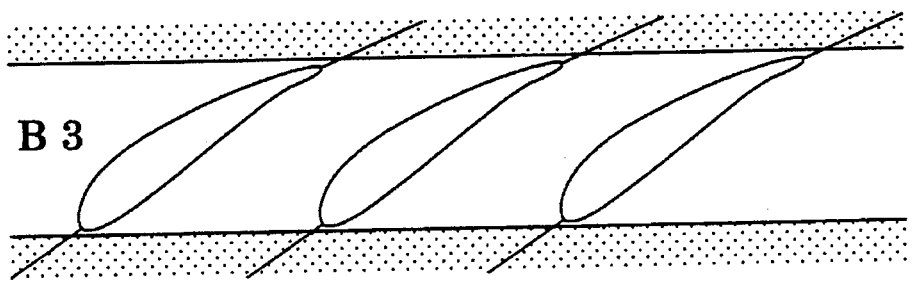
Figure 12:
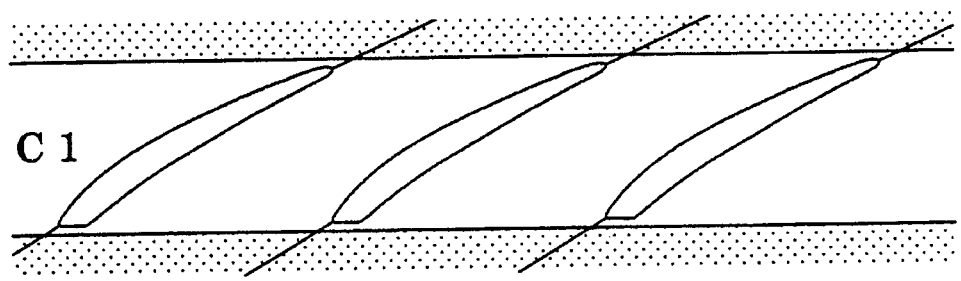
Figure 13:
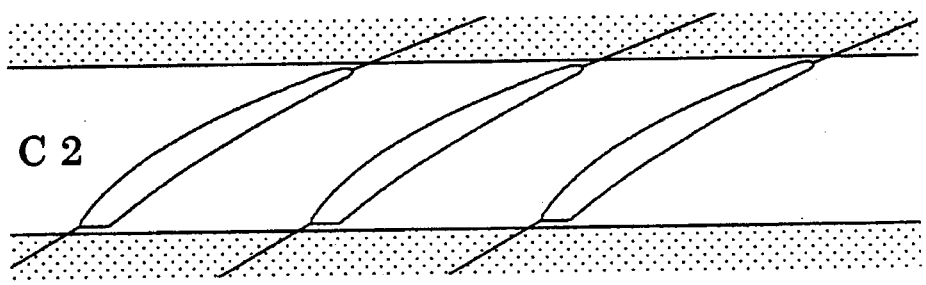
Figure 14:
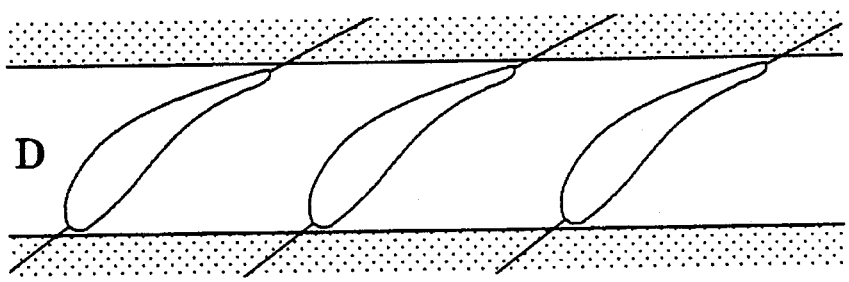
Figure 15:
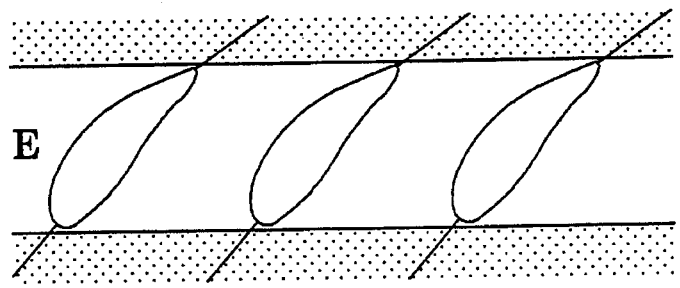

FIGS. 6–15 are diagrammatic sectional views similar to FIG. 1, showing 10 different kinds of arrays of vanes. The vane arrays A1, A2 and A3 respectively shown in FIGS. 6, 7 and 8 are made of vanes each having the same aerofoil configuration and the same angle of inclination, but are different from one another in the vane spacing such that the vane spacing is decreased from the vane array A1 to A3 via A2. Similarly, the vane arrays B1, B2 and B3 respectively shown in FIGS. 9, 10 and 11 are made of vanes each having the same aerofoil configuration and the same angle of inclination but are different from one another in the vane spacing such that the vane spacing is decreased from the vane array B1 to B3 via B2. Further, the vane arrays C1 and C2 respectively shown in FIGS. 12 and 13 are made of vanes each having a common aerofoil configuration and a common angle of inclination but are different from one another in the vane spacing such that the vane spacing is decreased from the vane array C1 to C2. The vane array D shown in FIGS. 14 and the vane array E shown in FIG. 15 are different from the foregoing vanes arrays in the aerofoil configuration.

Figure 16:
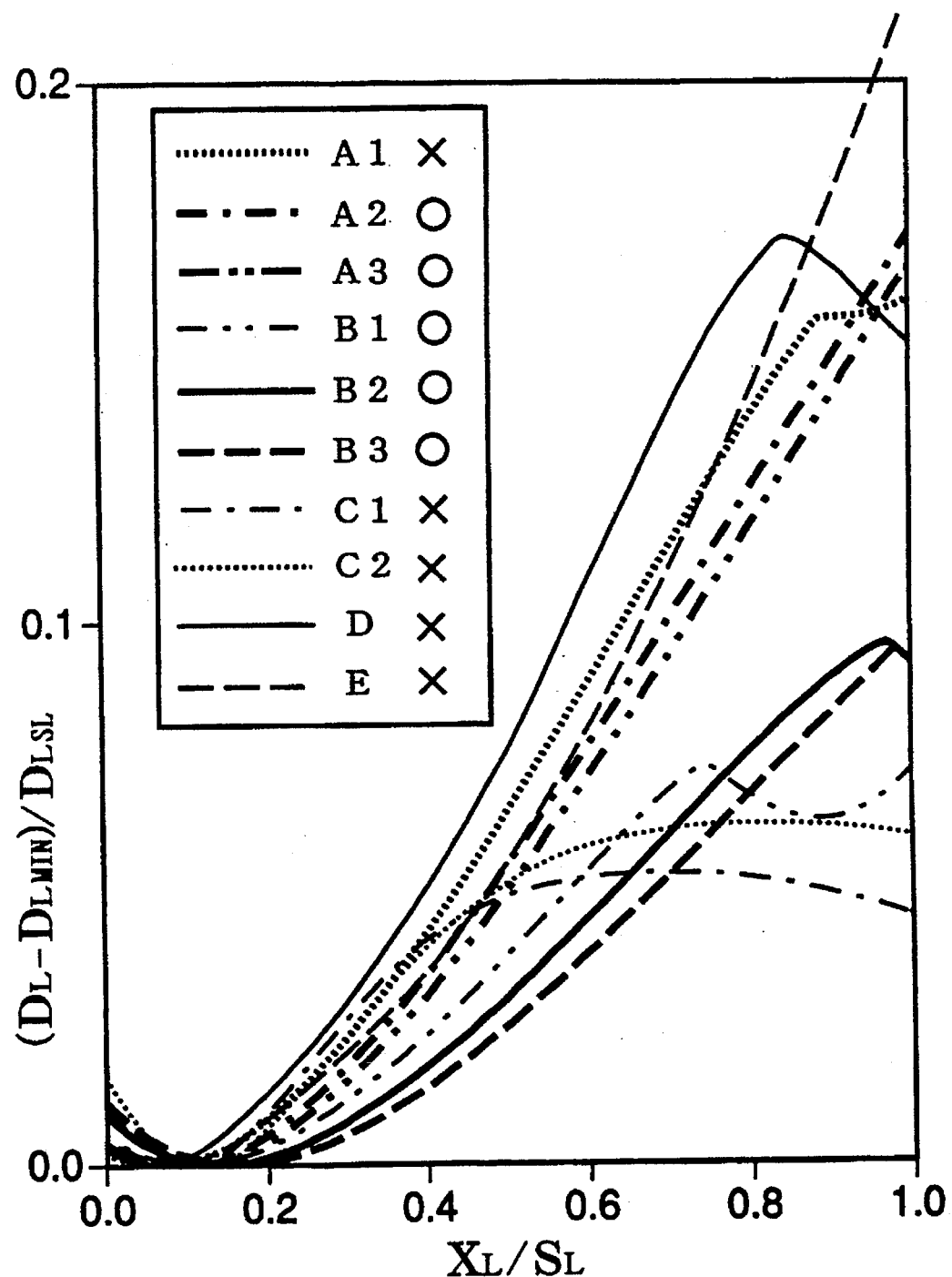
FIG. 16 is a graph showing changes of $D_L$ against $X_L/S_L$ with respect to the pressure side leading edge area of the vanes shown in FIGS. 6–15 in non-dimensional scales and the test results about the occurrence of separation.
Figure 17:
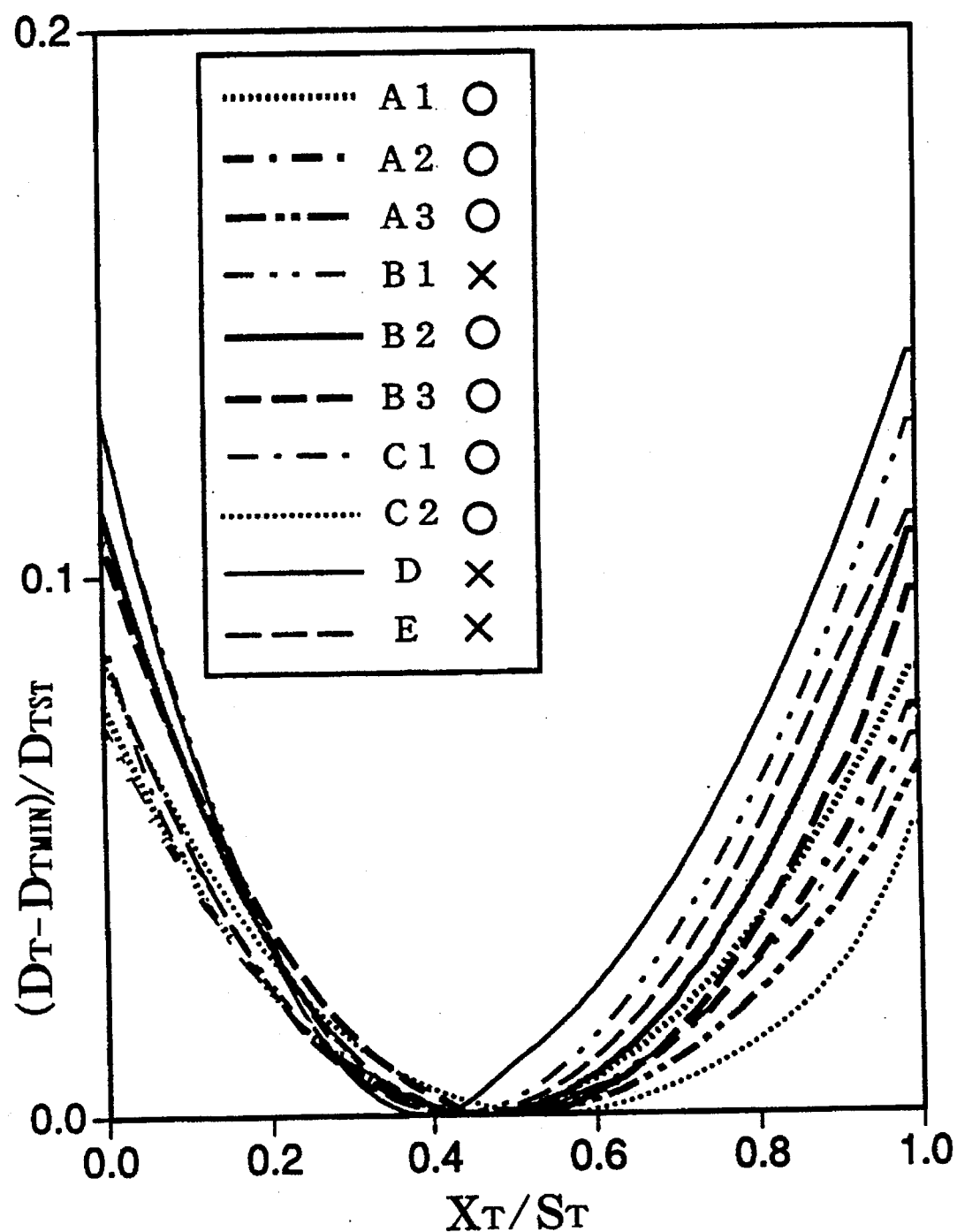
FIG. 17 is a graph showing changes of $D_T$ against $X_T/S_T$ with respect to the pressure side leading edge area of the vanes shown in FIGS. 6–15 in non-dimensional scales and the test results about the occurrence of separation.

The change of $D_L$ against $X_L/S_L$ at the pressure side leading edge area and that of $D_T$ against $X_T/S_T$ at the suction side trailing edge area are shown in FIGS. 16 and 17 with respect to the above-mentioned 10 kinds of vane arrays. In FIG. 16, the ordinate is expressed in the scale of $(D_L - D_{LMIN})/D_{LSL}$, by taking the minimum of $D_L$ as $D_{LMIN}$ and the value $D_L$ at $X_L = S_L$ as $D_{LSL}$, in order to make the performance of changes of $D_L$ more clear, and in FIG. 17, the ordinate is expressed in the scale of $(D_T - D_{TMIN})/D_{TST}$, by taking the minimum of $D_T$ as $D_{TMIN}$ and the value $D_T$ at $X_T = S_T$ as $D_{TST}$, in order to make the changes of $D_T$ to be more clear.

In FIGS. 16 and 17, whether the separation has occurred or not is shown by ○ and X, wherein ○ shows that the exfoliation did not occur, while X shows that the separation occurred. In more detail, with respect to the pressure side leading edge area, the separation occurred in the vane arrays A1, C1, C2, D and E, while the separation did not occur in the vane arrays A2, A3, B1, B2 and B3. Evaluating the results of experiments shown in FIG. 16, in view of the cause of the generation of the separation of working fluid at the pressure side leading edge area of the vane, surmised fluid dynammically from the relation between the array of vanes and the flow of working fluid therearound as in FIG. 1, and based upon the parameters set out as shown in FIG. 2, it is understood that the separation at the pressure side leading edge area of the vane is avoided if an increase of $(D_L - D_{LMIN})/D_{LSL}$ due to increase of $X_L/S_L$ occurs when $X_L/S_L$ is larger than 0.08 and the increase of $(D_L - D_{LMIN})/D_{LSL}$ due to increase of $X_L/S_L$ from 0.08 to approximately 0.8 is in a range of the values of the vane arrays A2. Such a condition is obtained from FIG. 16 as follows:

$$(D_L - D_{LMIN})/D_{LSL} \leq 0.38(X_L/S_L - 0.08)^{1.7} \quad (1)$$

wherein $S_L$: distance from point M to leading edge $L_2$ along inlet stream line $F_a$ $X_L$: variable expressing distance from point M along inlet stream line $F_a$ $D_L$: diameter of the circle according to the above definition which tangentially contacts inlet stream line $F_a$ at $X_L$ $D_{LMIN}$: minimum value of $D_L$ $D_{LSL}$: diameter of the circle according to the above definition which tangentially contacts inlet stream line $F_a$ at a position of $X_L = S_L$, i.e. leading edge $L_2$ In FIG. 16, in the region where the inclination of the curves is negative, the fluid flow passage between two adjacent vanes contracts in the direction of the fluid flow, so that the speed of the fluid flow increases, with a corresponding gradual decrease of the static pressure of the fluid, and therefore there hardly occurs the separation of working fluid from the vane surface. In contrast, in the region where the inclination of the curves is positive, the fluid flow passage between two adjacent vanes expands in the direction of the fluid flow, so that the speed of the fluid flow decreases, while a static pressure is recovered from the dynamic pressure of the fluid flow, to present a gradually increasing static pressure in the direction of the fluid flow, thus inducing a reverse flow of fluid. Under such a circumstance, particularly on the surface of the vanes where the flow of working fluid is applied with a resistance due to a friction by contact with the vane surface, the flow of working fluid is apt to separate along the vane surface.

Therefore, if the separation of working fluid at the pressure side surface of the leading edge area occurs or not can be estimated according to if the condition of Formula (1) is satisfied when viewed in a performance curve drawn on the coordinates as shown in FIG. 16.

In this connection, it is to be noted that, even when the rate of increase of $(D_L-D_{LMIN})/D_{LSL}$ against increase of $X_L/S_L$ is relatively low and finally turns into negative in a region of large $X_L/S_L$, as in the vane arrays C1 and C2, when the curve once deviates from the condition of Formula (1) in a region of small $X_L/S_L$, a separation once occurred becomes a seed of the separation, developing a further separation over the entire region.

Similarly, evaluating the results of experiments shown in FIG. 17, according to which the separation at the suction side trailing edge area occurred in the vane arrays B1, D and E, while the separation did not occur in the other vane arrays, in view of the cause of generation of the separation of working fluid at the suction side trailing edge area of the vane, surmised hydrodynammically from the relation between the array of vanes and the flow of working fluid therearound, based upon the parameters set out as shown in FIG. 2, it is understood that the separation at the suction side trailing edge area of the vane is avoided if an increase of $(D_T-D_{TMIN})/D_{TST}$ due to increase of $X_T/S_T$ occurs when $X_T/S_T$ is larger than 0.45 and the increase of $(D_T-D_{TMIN})/D_{TST}$ due to increase of $X_T/S_T$ from 0.45 to approximately 0.9 is in a range of the values of the vane arrays B2. Such a condition is obtained from FIG. 17 as follows:

$$(D_T-D_{TMIN})/D_{TST} \leq 0.36(X_T/S_T-0.45)^{1.7} \quad (2)$$

wherein $S_T$: distance from trailing edge $T_1$ to point N along outlet stream line $F_b$ $X_T$: variable expressing distance from point $T_1$ along outlet stream line $F_b$ $D_T$: diameter of the circle according to the above definition which tangentially contacts outlet stream line $F_b$ at $X_T$ $D_{TMIN}$: minimum value of $D_T$ $D_{TST}$: diameter of the circle according to the above definition which tangentially contacts outlet stream line $F_b$ at a position of $X_T=S_T$, i.e. point N Comparing FIG. 17 with FIG. 16, it will be noted that the values of the positive inclination allowed while avoiding the separation of working fluid at the suction side trailing edge area of the vanes are substantially smaller than those allowed while avoiding the separation of working fluid at the pressure side leading edge area. This is due to the fact that the pressure side leading edge area is followed by a central and a pre-trailing portion of the vane where the inclination becomes zero and then turns into negative.

In the above-described analyses and experiments on the occurrence of the separation with respect to the 10 kinds of vane arrays, the parameters are all related with the aerofoil and the array configuration of the stator vanes. The occurrence of the separation of working fluid in the stator vanes will of course be affected by the size of the vane array and the speed and the viscosity of the fluid flowing across the vane array, so that such a parameter as the Reynolds number representing those factors should have an influence. However, the present invention particularly deals with the stator of the torque converter for vehicles, and still further, the present invention is particularly directed to suppressing the separation of working fluid from the stator vane surface during the operation of such a particular torque converter at a fluid coupling condition. In view of such a preposition, the general size of the stator and the speed and the viscosity of the working fluid flowing across the stator may be assumed to be in a relatively limited, small, generally practical range. Therefore, the analyses and the results of experiments obtained according to the present invention based upon such general and practical conditions are considered to be effectively applicable to the uses which the present invention has intended.

Although the invention has been described in the above with respect to several embodiments thereof, it will be apparent to those skilled in the art that various modifications are possible without departing from the scope of the present invention.

We claim:

1. A stator of a torque converter for vehicles, comprising stator vanes each having such an aerofoil configuration and being arranged in such an array that, with respect to an area adjacent to a leading edge ($L_1$) of a pressure side surface of a first one ($V_1$) of said array of stator vanes, as viewed in a change of diameter ($D_L$) of a circle tangentially contacting with both said pressure side leading edge area surface of said first stator vane ($V_1$) and an inlet stream line ($F_a$) of working fluid directed to a leading edge ($L_2$) of a second one ($V_2$) of said array of stator vanes downstream of said first stator vane ($V_1$) along a flow of the working fluid, said circle substantially satisfies the following condition, for the purpose of suppressing a separation of the working fluid from said pressure side leading edge area surface of said first stator vane ($V_1$) in a fluid coupling condition attained after a substantial completion of torque conversion and therearound, against a shifting thereof between a position of $X_L=0.08S_L$ from a cross point (M) of a perpendicular extended from the leading edge ($L_1$) of said first stator vane ($V_1$) to said inlet stream line ($F_a$) and a position where it traverses the leading edge ($L_2$) of said second stator vane ($V_2$):

$$(D_L-D_{LMIN})/D_{LSL} \leq 0.38(X_L/S_L-0.08)^{1.7}$$

wherein $S_L$ is a distance from point M to leading edge $L_2$ along inlet stream line $F_a$ $X_L$ is a variable expressing distance from point M along inlet stream line $F_a$ $D_L$ is the diameter of the circle according to the above definition which tangentially contacts inlet stream line $F_a$ at $X_L$ $D_{LMIN}$ is a minimum value of $D_L$ $D_{LSL}$ is the diameter of the circle according to the above definition which tangentially contacts inlet stream line $F_a$ at a position of $X_L=S_L$.

2. A stator of a torque converter for vehicles, comprising stator vanes each having such an aerofoil configuration and being arranged in such an array that, with respect to an area adjacent to a trailing edge of a suction side surface of a first one ($V_2$) of said array of stator vanes, as viewed in a change of diameter ($D_T$) of a circle tangentially contacting with both said suction side trailing edge area surface of said first stator vane ($V_2$) and an outlet stream line ($F_b$) of working fluid extending from a trailing edge ($T_1$) of a second one ($V_1$) of said array of stator vanes upstream of said first stator vane ($V_2$) along a flow of the working fluid, said circle substantially satisfies the following condition, for the purpose of suppressing a separation of the working fluid from said suction side trailing edge area surface of said first stator vane ($V_2$) in a fluid coupling condition attained after a substantial completion of torque conversion and therearound, against a shifting thereof between a position of $X_T=0.45S_T$ from the trailing edge ($T_1$) of said second stator vane ($V_1$) and a position where it traverses a cross point (N) of a perpendicular extended from said trailing edge ($T_2$) of said first stator vane ($V_2$) to said outlet stream line ($F_b$):

$$(D_T - D_{TMIN})/D_{TST} \leq 0.36(X_T/S_T - 0.45)^{1.7}$$

wherein $S_T$ is a distance from trailing edge $T_1$ to point N along outlet stream line $F_b$ $X_T$ is a variable expressing distance from point $T_1$ along outlet stream line $F_b$ $D_T$ is the diameter of the circle according to the above definition which tangentially contacts outlet stream line $F_b$ at $X_T$ $D_{TMIN}$ is a minimum value of $D_T$ $D_{TST}$ is the diameter of the circle according to the above definition which tangentially contacts outlet stream line $F_b$ at a position of $X_T=S_T$.

3. A stator of a torque converter for vehicles according to claim 1, wherein, with respect to an area adjacent to a trailing edge of a suction side surface of said second stator vane ($V_2$), as viewed in a change of diameter ($D_T$) of a circle tangentially contacting with both said suction side trailing edge area surface of said second stator vane ($V_2$) and an outlet stream line ($F_b$) of the working fluid extending from the trailing edge ($T_1$) of said first stator vane ($V_1$), said circle substantially satisfies the following condition, for the purpose of suppressing a separation of the working fluid from said suction side trailing edge area surface of said second stator vane ($V_2$) in the fluid coupling condition, against a shifting thereof between a position of $X_T=0.45S_T$ from the trailing edge ($T_1$) of said first stator vane ($V_1$) and a position where it traverses a cross point (N) of a perpendicular extended from said trailing edge ($T_2$) of said second stator vane ($V_2$) to said outlet stream line ($F_b$):

$$(D_T - D_{TMIN})/D_{TST} \leq 0.36(X_T/S_T - 0.45)^{1.7}$$

wherein $S_T$ is a distance from trailing edge $T_1$ to point N along outlet stream line $F_b$ $X_T$ is a variable expressing distance from point $T_1$ along outlet stream line $F_b$ $D_T$ is the diameter of the circle according to the above definition which tangentially contacts outlet stream line $F_b$ at $X_T$ $D_{TMIN}$ is a minimum value of $D_T$ $D_{TST}$ is the diameter of the circle according to the above definition which tangentially contacts outlet stream line $F_b$ at a position of $X_T=S_T$.

4. A stator of a torque converter for vehicles comprising stator vanes each having such an aerofoil configuration and being arranged in such an array that a pressure side surface of each of said stator vanes adjacent to a leading edge thereof substantially satisfies the following conditions, in terms of a change of diameter ($D_L$) of a circle tangentially contacting both the pressure side surface of a first one ($V_1$) of said stator vanes adjacent to the leading edge ($L_1$) thereof and an inlet stream line ($F_a$) directed to the leading edge ($L_2$) of a second one ($V_2$) of said stator vanes, when said circle is shifted from a position of $X_L=0.08S_L$ distant from a cross point (M) at which said inlet stream line ($F_a$) intersects with a perpendicular extended from the leading edge ($L_1$) of said first stator vane relative to said inlet stream line ($F_a$) to a position of the leading edge ($L_2$) of said second stator vane, thereby suppressing a separation of working fluid from a surface of the stator vanes in a fluid coupling condition attained after a substantial completion of torque conversion and therearound:

$$(D_L - D_{LMIN})/D_{LSL} \leq 0.38(X_L/S_L - 0.08)^{1.7}$$

wherein $S_L$ is a distance from point M to leading edge $L_2$ along inlet stream line $F_a$ $X_L$ is a variable expressing distance from point M along inlet stream line $F_a$ $D_L$ is the diameter of the circle according to the above definition which tangentially contacts inlet stream line $F_a$ at $X_L$ $D_{LMIN}$ is a minimum value of $D_L$ $D_{LSL}$ is the diameter of the circle according to the above definition at a position of $X_L=S_L$.

5. A stator of a torque converter for vehicles comprising stator vanes each having such an aerofoil configuration and being arranged in such an array that a suction side surface of each of said stator vanes adjacent to a trailing edge thereof substantially satisfies the following conditions, in terms of a change of diameter ($D_T$) of a circle tangentially contacting both an outlet stream line ($F_b$) extended from the trailing edge of a first one ($V_1$) of said stator vanes and the suction side surface of a second one ($V_2$) of said stator vanes, when said circle is shifted from a position of $X_T=0.45S_T$ from the trailing edge ($T_1$) of said first stator vane to a position of a cross point (N) at which said outlet stream line ($F_b$) intersects with a perpendicular extended from the trailing edge ($T_2$) of said second stator vane relative to said outlet stream line ($F_b$), thereby suppressing a separation of working fluid from a surface of the stator vanes in a fluid coupling condition attained after a substantial completion of torque conversion and therearound:

$$(D_T - D_{TMIN})/D_{TST} \leq 0.36(X_T/S_T - 0.45)^{1.7}$$

wherein $S_T$ is a distance from trailing edge $T_1$ to point N along outlet stream line $F_b$ $X_T$ is a variable expressing distance from point $T_1$ along outlet stream line $F_b$ $D_T$ is the diameter of the circle according to the above definition which tangentially contacts outlet stream line $F_b$ at $X_T$ $D_{TMIN}$ is a minimum value of $D_T$ $D_{TST}$ is the diameter of the circle according to the above definition which tangentially contacts outlet stream line $F_b$ at a position of $X_T=S_T$.

6. A stator of a torque converter for vehicles according to claim 4, wherein a suction side surface of each of said stator vanes adjacent to a trailing edge thereof substantially satisfies the following conditions, in terms of a change of diameter ($D_T$) of a circle tangentially contacting both an outlet stream line ($F_b$) extended from the trailing edge of a first one ($V_1$) of said stator vanes and the suction side surface of a second one ($V_2$) of said stator vanes, when said circle is shifted from a position of $X_T=0.45S_T$ from the trailing edge ($T_1$) of said first stator vane to a position of a cross point (N) at which said outlet stream line ($F_b$) intersects with a perpendicular extended from the trailing edge ($T_2$) of said second stator vane relative to said outlet stream line ($F_b$), thereby suppressing the separation of working fluid from the surface of the stator vanes in the fluid coupling condition attained after a substantial completion of torque conversion and therearound:

$$(D_T - D_{TMIN})/D_{TST} \leq 0.36(X_T/S_T - 0.45)^{1.7}$$

wherein $S_T$ is a distance from trailing edge $T_1$ to point N along outlet stream line $F_b$ $X_T$ is a variable expressing distance from point $T_1$ along outlet stream line $F_b$ $D_T$ is the diameter of the circle according to the above definition which tangentially contacts outlet stream line $F_b$ at $X_T$ $D_{TMIN}$ is a minimum value of $D_T$ $D_{TST}$ is the diameter of the circle according to the above definition which tangentially contacts outlet stream line $F_b$ at a position of $X_T=S_T$.

* * * * *